April 13, 1926.

D. SIMON 1,580,926

AUTOMATIC SHOCK ABSORBER

Filed March 19, 1924

Inventor

Desiderius Simon

By his Attorney

Patented Apr. 13, 1926.

1,580,926

UNITED STATES PATENT OFFICE.

DESIDERIUS SIMON, OF NEW YORK, N. Y.

AUTOMATIC SHOCK ABSORBER.

Application filed March 19, 1924. Serial No. 700,315.

*To all whom it may concern:*

Be it known that I, DESIDERIUS SIMON, a citizen of Yugoslavia, and resident of New York city, in the county of New York and State of New York, have invented certain new and useful Improvements in Automatic Shock Absorbers, of which the following is a specification.

This invention relates to a shock absorber for automobiles and similar vehicles, and a particular object of the invention is to provide a shock absorber which in its operation will automatically accommodate itself in response to the varying type of road surface and speed of the vehicle.

A further object is to provide a shock absorber which:

First, will offer little or no resistance against the relatively slight vertical movements of the vehicle parts and thus leave the vehicle springs free to cushion such movements as occur for instance when the vehicle is riding over smooth roadway.

Second, will offer relatively slight resistance to what may be termed the shock movements of the vehicle parts, Third, will offer relatively greater resistance to what may be termed the rebound movements of the vehicle parts, Fourth, in the performance of the functions referred to will have its operations always governed automatically in degree according to the speed or rapidity with which said functions are performed.

A further object is to provide a shock absorber having the above characteristics and which performs with substantially equal efficiency on both sides of a central or normal position.

A further object is to provide a shock absorber including a fluid containing casing, an operating element utilizing said fluid in the resistance of shocks, and means to compensate for expansion and contraction of said fluid.

Other objects and aims of the invention, more or less specific than those referred to above, will be in part obvious and in part pointed out in the course of the following description of the elements, combinations, arrangements of parts and application of principles constituting the invention, and the scope of protection contemplated will be indicated in the appended claims.

In the accompanying drawings which are to be taken as a part of this specification, and in which I have shown merely a preferred form of embodiment of the invention:—

Figure 1:
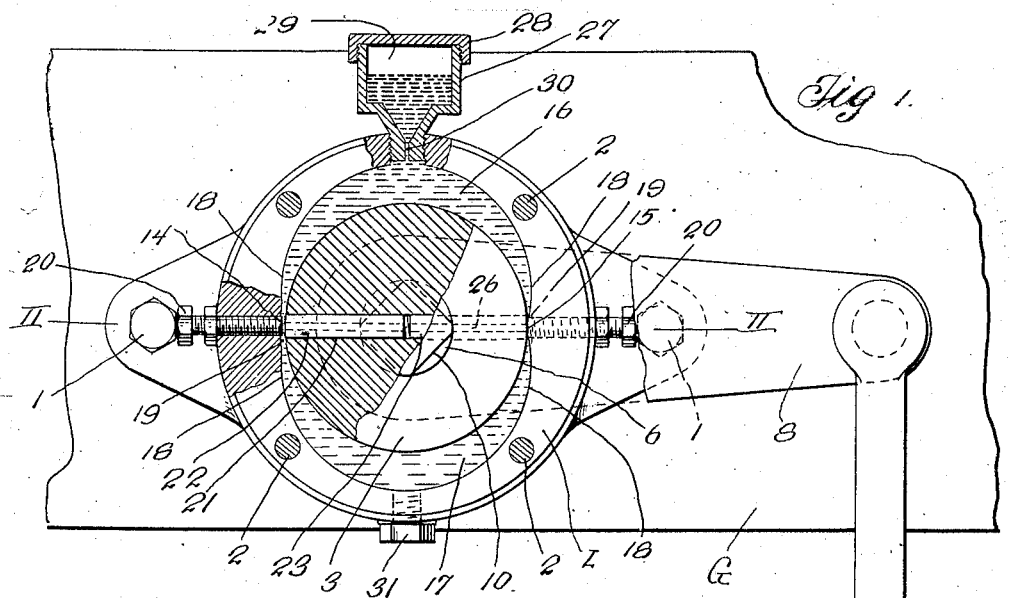
Fig. 1 is a side elevational view of a shock absorber constructed in accordance with this invention the cover being removed and parts being shown in section for a better disclosure of details, and the whole being illustrated in association with relatively movable parts of a vehicle.
Figure 2:
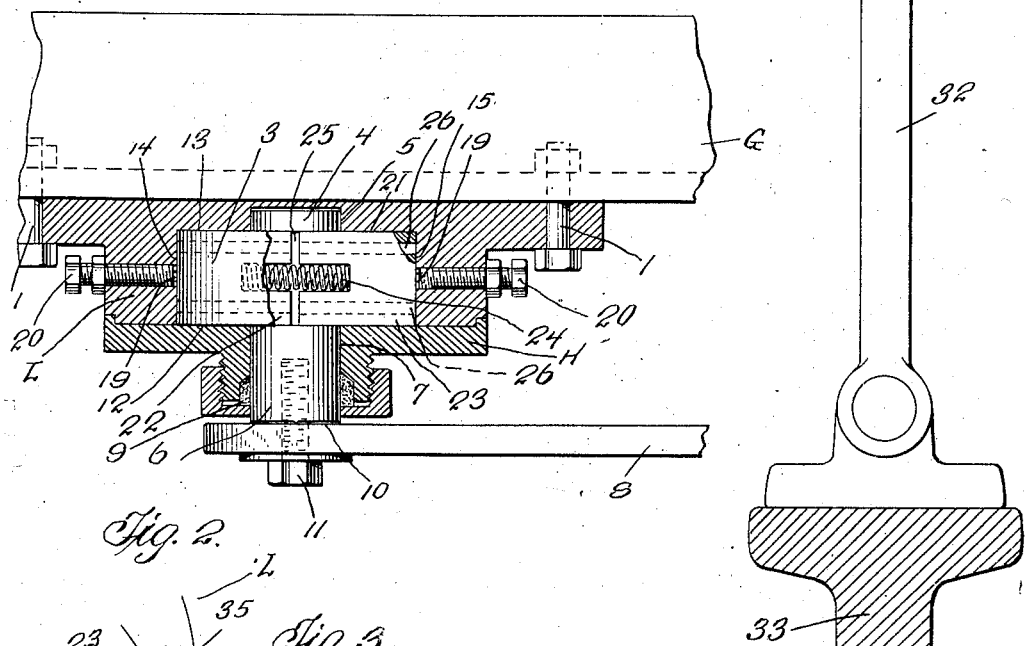
Fig. 2 is a horiozntal sectional view taken substantially upon the plane of line II—II of Fig. 1.

Referring to the drawings for describing in detail the exemplary structure illustrated therein the reference character L indicates the main body or casing of the device. This is mounted upon one of the movable parts of the vehicle as for instance on the side frame G, and may be secured thereto as for instance by means of bolts or the like 1—1. A cover H is provided being connected with the body L by suitable attaching means as for instance the bolts 2—2 so that it is rigid with said body.

Within the body and held by the cover is a disk-shaped rotor 3 having a concentric bearing extension as 4 at one side thereof received within a bearing 5 of the body and having a similar concentric bearing extension 6 at its opposite side received in a bearing 7 of the cover. The bearing 7 is formed entirely through the cover and the extension 6 projects through said bearing and carries exteriorly thereof an operating lever 8.

A suitable stuffing box structure as 9 is formed upon the cover engaging the extension 6.

The operating lever 8 may be connected with the outer end of the extension 6 in any appropriate manner but as illustrated said extension is formed with a squared end 10 over which said lever fits and to which said lever is held by means of a lock screw 11 so that up and down swinging movement of the lever will impart a corresponding oscillating movement to the rotor 3.

The cavity which is provided by the body and its cover for containing the rotor 3 is shaped so that its front and rear walls as 12 and 13 rest flatly against the front and rear surfaces of the rotor, respectively. Its side walls are shaped so that they engage the peripheral surface of the rotor only at two diametrically opposite points as at 14 and 15, said points being preferably in a common horizontal plane.

Above and below the contact points 14 and 15 the side walls of the cavity extend in circular curves away from the peripheral surface of the rotor so as to provide an upper compartment 16 and a lower compartment 17. The wall surface portions as 18 of each of said compartments adjacent to the contact points 14 and 15 are made to converge toward said points so that the portions of said compartments 16 and 17 adjacent said contact points taper to enlarged proportions in both directions away from said points.

It is intended that the compartments 16 and 17 shall be entirely filled with oil or other suitable fluid as indicated and that the oil contained in each compartment will be shut off form connection with the oil in the opposite compartment by the contact parts or portions 14 and 15 except that in each of said contact portions a suitable by-pass as 19 is provided controlled by regulating screws 20 so that the oil from one compartment may pass to the other in regulated quantities according to the position of the screws 20.

Extending diametrically through the rotor is a rectangular slideway 21 and within this slideway is mounted a pair of separately formed paddles 22 and 23, said slideway and paddles being arranged so that in the normal position of the rotor they will extend in a horizontal plane, the outer ends of the paddles respectively being in surface contact with the opposite contact portions 14 and 15 of the casing.

A suitable compression spring 24 is provided within the rotor and positioned between inner end surface portions of the paddles for constantly urging the paddles redially outwardly of the rotor.

Any means may be provided for permitting the oil to flow into and out of the space as 25 between the inner ends of the paddles as the paddles move inwardly and outwardly of the rotor the means indicated in the drawings for this purpose being a pair of passages as 26 drilled longitudinally through each of the paddles.

A filler cup 27 is provided at the upper side of the casing having preferably a tight screw cap 28 thereon. It is intended that the oil within the casing shall entirely fill said casing and extend up into the cup 27 but that said cup shall be only partly filled thus leaving an air space as 29 above the level of the oil. A very small passage only as 30 is provided for connection between the cup 27 and the interior of the casing. The purpose of this arrangement is multifold:

First, so that portions of the oil within the cup will flow into the casing to replace any slight leakage from the casing.

Second, so that the level of the oil may be inspected by removal of the cover 28 at any time.

Third, so that the air space 29 will accommodate expansion and contraction of the body of oil, due to changes of temperature, and Fourth, so that no appreciable amount of oil will move into the air space 29 during the momentary periods of pressure occurring during the operation of the mechanism.

At the lower side of the casing a suitable drain plug as 31 is provided by which the entire oil contents may be drained away whenever desired.

Noting that the lever 8 is connected, by a link 32 with the vehicle axle as 33 and that the normal position of all of the parts is substantially as indicated in the drawings and particularly that the paddles 22 and 23 stand horizontal with their outer ends engaging the contact parts 14 and 15 of the casing, the operation of the mechanism will now be understood:

During the normal running of the vehicle over smooth roadway, at which time there is only slight relative movement of the chassis G and axle 33 and it is desirable that the vehicle springs should function softly and easily to smoothen these movements, the outer ends of the paddles will oscillate back and forth across the faces of the contact portions 14 and 15 without being able to move outwardly of the rotor and hence no impedance will be offered by the mechanism against the proper and desirable functioning of the vehicle springs.

Figure 3:
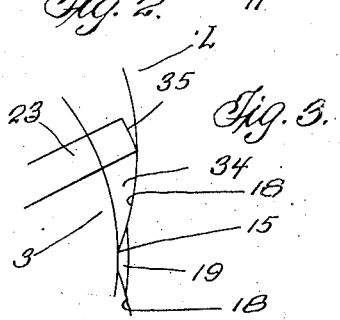
Fig. 3 is a diagrammatic detail view illustrating the operation of the cushioning elements.

If on the other hand the vehicle is passing at slow speed over a very rough roadway, at which time the excessive flexing of the vehicle springs and their consequent tendency to excessive rebound requires the maximum shock absorbing ability of the device to be called into play, it will be seen that at each "shock" movement of the vehicle parts G and 33 the outer ends of the paddles will pass off of the contact points 14 and 15 and to appreciable distances beyond said contact points, as for instance as indicated in Fig. 3. During this movement the spring 24 will urge the paddles outwardly so that a quantity of the oil will be pocketed between the paddles and the contact points behind them, as in the pockets indicated by the reference numeral 34 of Fig. 3. This pocketed oil will oppose the "rebound" movement of the paddles and the degree of opposition will depend upon the size of the passages left by the screws 20 through the by-pass as 19.

From this operation it will be seen:

First, that what is for convenience here termed the "shock" movements of the rotor, that is the movements of the paddles in directions away from the contact portions of the casing and into one of the compartments 16—17, is opposed by engagement of the progressively protruding end of the paddle against the body of oil to move the oil. Referring to the example as indicated in Fig. 3 note that during this period the body of oil within the compartment 16 above the paddle will move partly around said compartment and through the by-pass 19 of the contact portion 14 and partly around the outer end surface as 35 of the paddle and into the pocket 34. Because of the shape of the outer end surface 35 of the paddle and the relatively angular disposition of the wall 18 of the casing it will be quite possible for a portion of the oil to move around the end 35 and into the pocket 34 while the paddle is moving in a direction away from the contact portion of the casing but quite impossible for the oil to return again around said end 35 from the pocket 34 when the paddle returns to normal.

Second, that what is for convenience here termed the "rebound" movement of the rotor, that is the return movement of the paddles from their "shock" positions to normal position, is positively opposed by the engagement of the protruding end of the paddle against the pocketed oil, requiring that all of the pocketed oil be passed through the by-passes 19 before return of the paddle to normal if possible.

Both the "shock" and "rebound" movements of the rotor are more or less opposed but the "rebound" movements encounter a relatively greater opposition than the "shock" movements.

The size of passages 26 through the paddles, by determining the flow of oil into and out of the space 25 will of course also determine the speed of movement of the paddles at all times.

Now it will be apparent that the amount of opposition present in either the "shock" or the "rebound" movements of the rotor will depend upon just how much of the end portions of the paddles protrude during the period of said movements, and it will be apparent also that just how much or how little of said end portions protrude during any cycle of movement is dependent upon several factors, to wit: the strength of the spring 24, the ease of sliding fit of the paddles within their slideways, the viscosity of the oil, size of passages 26, and the degree of rapidity with which the cycle takes place. All of these factors excepting the last are simple matters of mechanical calculation, and when they have been once determined then the factor of rapidity of movement remains to automatically control the shock absorbing qualities of the mechanism in strict conformity to the need of shock absorbing value.

If the vehicle is passing over such roadway and at such speed that the rapidity of "shock" and "rebound" movements is so great that the paddles do not have time to move appreciably from their inner positions then the opposition offered to said movements is correspondingly negligible, which is a proper condition since under such circumstances the vehicle springs should be allowed a free cushioning value, their successive "rebound" movements following so rapidly the "shock" movements that no considerable rebound is possible.

If the vehicle is passing over such roadway and at such speed that the "shock" and "rebound" movements occur with reduced rapidity then the paddles will move outwardly at each "shock" movement and the pocketed oil will oppose the "rebound" movements in degree according the distance to which the paddles protrude, the maximum resistance to "rebound" being present only when the cycles of movement are so slow as that the paddles will engage against the side surface of the casing at the extreme extent of the "shock" movements of the paddles.

The slow bouncy movements of the vehicle during riding over a rough roadway will thus generate the maximum amount of shock absorbing value available, while the less bouncy movements, occasioned by a smoother roadway or greater speed, will generate a correspondingly less degree of shock absorbing value. The mechanism is thus correctly said to be effective in its shock absorbing values to a degree automatically controlled by the quality of the roadway and the speed of travel.

The fact, as hereinabove mentioned, that the mechanism disclosed provides for a positive resistance to both "shock" and "rebound" movements of the vehicle parts is of importance as means not only of cushioning and absorbing the vibratory movements of the vehicle body as a whole but is of particular importance as a means tending to absorb and prevent undue swaying of the vehicle body as will be readily understood.

By arranging the paddles 22 and 23 and their associated parts so that they will operate with equal effectiveness at either side of a normal central position it will be understood that the operation as hereinabove set forth will take place upon either side of said normal position and that by this means a double cushioning value is afforded tending always to prevent excessive rebound from either an upper or lower shock extreme.

As many changes could be made in this construction without departing from the scope of the invention as defined in the following claims, it is intended that all matter contained in the above description or shown in the accompanying drawings, shall be interpreted as illustrated only and not in a limiting sense.

Having thus described my invention, what I claim as new and desire to secure by Letters Patent is:—

1. A shock absorber for vehicles comprising means automatically operable to alter its shock absorbing value in accordance with road and speed conditions.

2. A shock absorber for vehicles comprising parts to resist rebound movements of the vehicle chassis, and means whereby the efficiency of said parts is automatically altered in accordance with road and speed conditions.

3. A shock absorber for vehicles comprising a casing adapted to be connected with one part of the vehicle, a member arranged within said casing, an operating arm connected with said member, and having connection with a relatively movable part of the vehicle, and means comprised in said mentioned member cooperative with the casing to resist relative movements of the vehicle parts, said means being constructed so that the efficiency thereof is automatically altered in accordance with road and speed conditions.

4. A shock absorber for vehicles comprising a casing adapted to be connected with one part of the vehicle, a rotor arranged within said casing, an operating arm connected with said rotor and having connection with a relatively movable part of the vehicle to rotate said rotor, the casing being adapted to contain a quantity of fluid, means cooperative between the casing and the rotor adapted to utilize said fluid for cushioning movements of the rotor, and means providing an expansion chamber for said fluid.

5. A shock absorber for vehicles comprising a casing adapted to be connected with one part of the vehicle, a rotor arranged within said casing, an operating arm connected with said rotor and having connection with a relatively movable part of the vehicle to rotate said rotor, the casing being adapted to contain a quantity of fluid, means cooperative between the casing and the rotor adapted to utilize said fluid for cushioning movements of the rotor, there being two compartments within the casing within which the fluid is contained, and means providing an expansion chamber for said fluid separated from the main interior of said casing by a reduced passage way extending common to both of said compartments.

6. A shock absorber for vehicles comprising a casing adapted to be connected with one part of the vehicle, a rotor arranged within said casing, an operating arm connected with said rotor and having connection with a relatively movable part of the vehicle to rotate said rotor, the casing being adapted to contain a quantity of fluid, and a paddle carried by the rotor spring pressed radially thereof adapted to cooperate with the walls of the casing to utilize said fluid for cushioning movements of the rotor.

7. A shock absorber for vehicles comprising a casing adapted to be connected with one part of the vehicle, a rotor arranged within said casing, an operating arm connected with said rotor and having connection with a relatively movable part of the vehicle to rotate said rotor, the casing being adapted to contain a quantity of fluid, a paddle carried by said rotor spring pressed radially thereof adapted to pocket a portion of said fluid between said rotor and the wall of the casing, there being a passage provided for egress of the pocketed fluid, and means to regulate the size of said passage, all whereby to cushion the rotary movements of said rotor.

8. A shock absorber for vehicles comprising a casing adapted to be connected with one part of the vehicle, a rotor within the casing, an operating arm connected with said rotor and having connection with a relatively movable part of the vehicle to rotate said rotor, a pair of separately formed paddles carried by the rotor spring pressed to slide radially of the rotor, the casing being adapted to contain a quantity of fluid, and the walls of the casing being shaped to cooperate with said paddles to utilize said fluid for cushioning the movements of the rotor.

9. A shock absorber for vehicles comprising a casing adapted to be connected with one part of the vehicle, a rotor within the casing, an operating arm connected with said rotor and having connection with a relatively movable part of the vehicle to rotate said rotor, a pair of separately formed paddles carried by the rotor spring pressed to slide radially of the rotor, the casing being adapted to contain a quantity of fluid, the walls of the casing being shaped to cooperate with said paddles to utilize said fluid for cushioning the movements of the rotor, and said paddles having passages therethrough through which portions of the oil must pass to thereby influence the speed of movement of said paddles.

10. A shock absorber for vehicles comprising a casing adapted to be connected with one part of the vehicle, a rotor within the casing, an operating arm connected with said rotor and having connection with a relatively movable part of the vehicle to rotate said rotor, a pair of separately formed paddles carried by the rotor extending diametrically of the rotor and adapted to protrude radially of the rotor on diametrically opposite points, the casing being adapted to contain a quantity of fluid, the walls of the casing having parts to hold said paddles against protruding from said rotor when the rotor is in a central or normal position, and the walls of the casing being shaped to permit protrusion of said paddles at opposite sides of said central points for the purpose set forth.

11. A shock absorber for vehicles comprising a casing adapted to be connected with one part of the vehicle, a rotor within the casing, an operating arm connected with said rotor and having connection with a relatively movable part of the vehicle to rotate said rotor, a pair of separately formed paddles carried by the rotor spring pressed to slide radially outwardly of the rotor and against the wall of the casing, the casing being adapted to contain a quantity of fluid and the walls of the casing being shaped to permit the paddles to move outwardly different distances at different rotary positions.

12. A shock absorber for vehicles comprising a casing adapted to be connected with one part of the vehicle, a rotor within the casing, an operating arm connected with said rotor and having connection with a relatively movable part of the vehicle to rotate said rotor, a pair of separately formed paddles carried by the rotor spring pressed to slide radially outwardly of the rotor and against the wall of the casing, the casing being adapted to contain a quantity of fluid and the walls of the casing being shaped to cooperate with the paddles to utilize the fluid for automatically altering the shock absorbing value in accordance with road and speed conditions.

13. A shock absorber for vehicles comprising a casing adapted to be connected with one part of the vehicle, a rotor within the casing, an operating arm connected with said rotor and having connection with a relatively movable part of the vehicle to rotate said rotor, a separately formed paddle carried by the rotor spring pressed to slide radially outwardly of the rotor and against the wall of the casing, the casing being adapted to contain a quantity of fluid and the wall of the casing being shaped to cooperate with the paddle to utilize the fluid for automatically altering the shock absorbing value in accordance with road and speed conditions.

In testimony whereof I affix my signature.

DESIDERIUS SIMON.